March 22, 1927.

C. B. ROBINSON 1,622,209

BORING AND REAMING TOOL

Filed Feb. 27, 1925

INVENTOR
CHARLES B. ROBINSON,
By Toulmin & Toulmin,
ATTORNEYS

Patented Mar. 22, 1927.

1,622,209

UNITED STATES PATENT OFFICE.

CHARLES B. ROBINSON, OF WILMINGTON, OHIO, ASSIGNOR TO THE IRWIN AUGER BIT COMPANY, OF WILMINGTON, OHIO, A CORPORATION OF OHIO.

BORING AND REAMING TOOL.

Application filed February 27, 1925. Serial No. 11,945.

My invention relates to a boring and reaming tool.

It is the object of my invention to provide a cheap but effective boring or reaming tool capable of treating an object preparatory to starting screws in it or capable of reaming wood or metal or other materials and boring holes.

It is a further object to provide such a boring and reaming tool with a square shank for a handle or bit brace or a round shank for boring and drilling machines.

It is an additional object to provide such a tool so constructed that it may be made out of discarded parts of auger bits which are waste material in every bit factory.

It is my special object of providing a reamer with a screw point to draw the reamer into the wood or other material.

Referring to the drawing:

Figure 1 indicates the bar of stock formed with a shank which may be either specially prepared as shown in Figure 1 or may be a discard or waste product in a bit factory.

Figure 1:
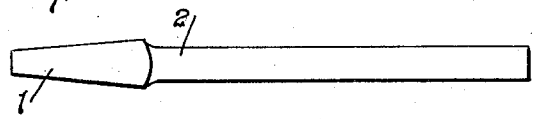
Figure 2:
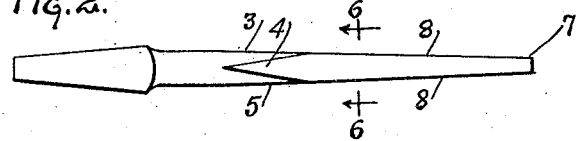
Figure 2 shows the reaming surface formed on the body.
Figure 3:
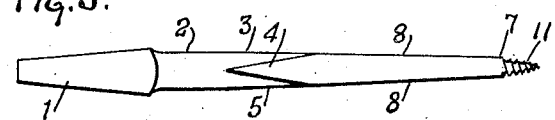
Figure 3 is a similar view showing the screw formed on the end of the reamer.
Figure 4:
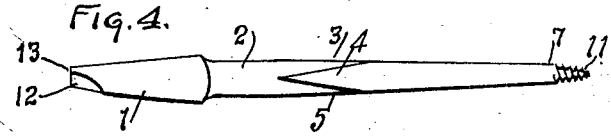
Figure 4 is a view of the combined tool showing a screw driver end formed on the shank.

Referring to the drawings in detail, 1 is a shank usually square in section having rearwardly converging walls so that the conventional shank to fit in a brace may be formed. 2 designates the body which is approximately cylindrical from the shank to the intermediate part of the body. This body is ground off on the four sides, 3, 4, 5 and 6 and so ground that these sides taper towards the end 7 of the tool. The sharp edges 8 so formed form the reaming or cutting edges.

Figure 7:
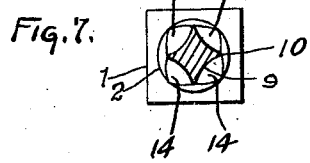
Figure 7 shows the tool when the side walls are concave.

If desired these faces may be made concave as in Figure 7, such faces being designated 9 and forming the edges 10.

A very fine sharp threaded screw 11 is placed upon the end 7 of the tool. Toward this pointed screw-threaded tip 11 converge the cutting edges 8 or 10.

This is useful for both starting the tool and drawing it into the material which is being bored and reamed and is also useful for making a threaded hole in material into which it is desired to force a screw.

If desired, a portion of the shank may be removed as at 12 to form a sharp edge 13 for use as a screw driver. Thus one tool will provide means of starting the screw in the material and then can be used for driving the screw into the material which is to support it.

Figure 5:
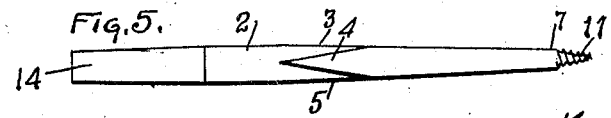
Figure 5 is a similar view to Figure 3 showing the round shank for machine tools.
Figure 6:
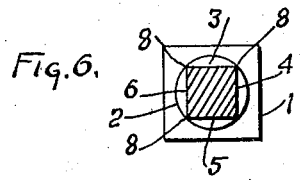
Figure 6 is a section on the line 6—6 of Fig. 2 showing the section of the tool when it has edges at right angles to each other.

Figure 5 illustrates a round shank 14 on such a tool for use in a machine tool.

As illustrated in Figure 7 the inner end of each of the concave faces 9 is restricted and outwardly curved, as indicated by the numeral 14. When the tool is rotated the cuttings following an outward path in the hole or opening being formed are directed into the restricted outwardly curved ends 14 and are thus caused to move or discharge in a lateral direction. It is, therefore, apparent that instead of the opening or hole being clogged as usual the cuttings will always be discharged laterally of the outer end of the same.

It will be understood that I desire to comprehend within my invention such modifications as may be necessary to adapt it to varying conditions and uses.

Having thus fully described my invention, what I claim as new and desire to secure by Letters Patent, is:

A boring and reaming bit comprising a body part, a shank at one end of the body part and a pointed screw-threaded tip at the other end of the body part, said body part being approximately cylindrical from its intermediate part to the shank and said body part being tapered from the cylindrical part to the screw-threaded tip with said tapered part having flattened sides to provide longitudinal cutting edges converging toward the screw-threaded tip.

In testimony whereof, I affix my signature.

CHARLES B. ROBINSON.